US011228789B2

(12) United States Patent
Watson et al.

(10) Patent No.: US 11,228,789 B2
(45) Date of Patent: Jan. 18, 2022

(54) VEHICLE ENTERTAINMENT SYSTEMS FOR COMMERCIAL PASSENGER VEHICLES

(71) Applicant: Panasonic Avionics Corporation, Lake Forest, CA (US)

(72) Inventors: Philip Watson, Lake Forest, CA (US); Steven Bates, Mission Viejo, CA (US); Sarvamangala Hendi, Anaheim, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

(21) Appl. No.: 16/868,396

(22) Filed: May 6, 2020

(65) Prior Publication Data

US 2021/0352335 A1    Nov. 11, 2021

(51) Int. Cl.
*H04N 21/214* (2011.01)
*H04W 4/14* (2009.01)
*H04W 4/42* (2018.01)
*H04N 21/2187* (2011.01)

(52) U.S. Cl.
CPC ..... *H04N 21/2146* (2013.01); *H04N 21/2187* (2013.01); *H04W 4/14* (2013.01); *H04W 4/42* (2018.02)

(58) Field of Classification Search
CPC . H04N 21/2146; H04N 21/2187; H04W 4/14; H04W 4/42
See application file for complete search history.

(56) References Cited

U.S. PATENT DOCUMENTS

| | | | |
|---|---|---|---|
| 8,734,256 B2 | 5/2014 | Sizelove | |
| 8,862,762 B1* | 10/2014 | Motrenko | H04N 21/6131 709/231 |
| 2002/0032906 A1* | 3/2002 | Grossman | H04N 21/812 725/42 |
| 2003/0217363 A1* | 11/2003 | Brady, Jr. | H04L 29/06 725/76 |
| 2004/0097288 A1 | 5/2004 | Sloate et al. | |
| 2004/0267955 A1* | 12/2004 | Konetski | H04L 67/2823 709/231 |
| 2006/0107295 A1* | 5/2006 | Margis | H04N 21/44204 725/81 |
| 2006/0205517 A1 | 9/2006 | Malabuyo et al. | |
| 2007/0018952 A1* | 1/2007 | Arseneau | H04H 40/27 345/156 |

(Continued)

*Primary Examiner* — Fernando Alcon
(74) *Attorney, Agent, or Firm* — Perkins Coie LLP (57) ABSTRACT

This patent document describes techniques are related to providing an entertainment to passengers on a commercial passenger vehicle. In one aspect, a method for providing an entertainment to passengers on a commercial passenger vehicle comprises: receiving a request, from a first passenger on the commercial passenger vehicle, to allow the first passenger to provide a live video, the live video obtained by capturing, in real time, an activity associated with the first passenger on the commercial passenger vehicle; receiving one or more requests, from one or more additional passengers on the commercial passenger vehicle, to view the live video; receiving the live video from the first passenger; and distributing the live video to the additional passengers.

18 Claims, 9 Drawing Sheets

(56) References Cited

U.S. PATENT DOCUMENTS

| | | | | |
|---|---|---|---|---|
| 2012/0066726 A1* | 3/2012 | Mondragon | ....... | H04N 21/4312 |
| | | | | 725/76 |
| 2013/0328997 A1* | 12/2013 | Desai | .................... | H04N 5/247 |
| | | | | 348/14.02 |
| 2014/0157333 A1* | 6/2014 | Daniel | ............. | H04N 21/26208 |
| | | | | 725/81 |
| 2014/0304750 A1* | 10/2014 | Lemmey | .............. | H04N 21/414 |
| | | | | 725/75 |
| 2015/0017915 A1* | 1/2015 | Hennequin | ........ | H04B 7/18506 |
| | | | | 455/41.2 |
| 2015/0026714 A1* | 1/2015 | Yuan | ................ | H04N 21/25841 |
| | | | | 725/32 |
| 2016/0014435 A1* | 1/2016 | Cronin | ............. | H04N 21/21805 |
| | | | | 725/82 |
| 2016/0127295 A1* | 5/2016 | Karimli | .................. | H04L 51/20 |
| | | | | 709/206 |
| 2016/0316237 A1* | 10/2016 | Couleaud | ......... | H04N 21/25883 |
| 2016/0381163 A1 | 12/2016 | Mashtakov | | |
| 2017/0188201 A1* | 6/2017 | Cansino | ............ | G08G 1/09626 |
| 2017/0313248 A1 | 7/2017 | Kothari | | |
| 2018/0167656 A1* | 6/2018 | Ortiz | ..................... | A63F 13/355 |
| 2019/0037247 A1* | 1/2019 | Hodge | .............. | H04N 21/4753 |
| 2019/0037372 A1* | 1/2019 | Girard | .................. | H04W 12/02 |
| 2019/0159003 A1 | 5/2019 | Padgett et al. | | |
| 2019/0172085 A1* | 6/2019 | Newlands | .......... | H04N 21/2223 |
| 2019/0273964 A1* | 9/2019 | Couleaud | ............... | H04H 20/62 |
| 2020/0065853 A1* | 2/2020 | Cvinar | .............. | H04N 21/4781 |
| 2020/0079318 A1* | 3/2020 | van Vliet | ................ | B60R 22/48 |

* cited by examiner

VEHICLE ENTERTAINMENT SYSTEMS FOR COMMERCIAL PASSENGER VEHICLES

TECHNICAL FIELD

This document is generally related to systems, methods, and apparatus to entertain passengers in a commercial passenger vehicle such as airplanes, passenger train buses, cruise ships, and others.

BACKGROUND

Commercial travel has evolved to provide entertainment options to passengers traveling to their destinations. For example, in an airplane or train, entertainment options are provided on monitors located on the back of seats, where the monitors can enable passengers to watch movies or television shows as they travel to their destinations. The monitors can also provide travel related information to the passengers. For example, passengers can view a map with the current location of the airplane or train and an estimated time of arrival to their destinations. Thus, in-vehicle entertainment systems can be designed to provide passengers with a positive travel experience.

SUMMARY

This patent document describes exemplary systems, methods, and apparatus to provide a way for a passenger to more participate and more engage with in-vehicle entertainment options provided in commercial passenger vehicles. Some implementations of the disclosed technology allow a passenger to provide a live video stream in commercial passenger vehicles and share the live video stream with another passenger. Some other implementations of the disclosed technology can support live chat among passengers who watch a same live video stream. Various implementations of the disclosed technology related to providing a new entertainment option which can encourage more participation from passengers.

In one aspect, a method of providing an entertainment to passengers on a commercial passenger vehicle is provided. The method includes: receiving a request, from a first passenger on the commercial passenger vehicle, to allow the first passenger to provide a live video, the live video obtained by capturing, in real time, an activity associated with the first passenger on the commercial passenger vehicle; receiving one or more requests, from one or more additional passengers on the commercial passenger vehicle, to view the live video; receiving the live video from the first passenger; and distributing the live video to the additional passengers.

In another aspect, a method of providing an entertainment to passengers on a commercial passenger vehicle is provided. The method comprises: receiving a live video from a first passenger on the commercial passenger vehicle, the live video obtained by capturing, in real time, an activity associated with the first passenger on the commercial passenger vehicle; distributing the live video to one or more additional passengers on the commercial passenger vehicle; and determining to provide a reward to at least one of the first passenger and the additional passengers based on a predetermined rule.

In another aspect, an in-vehicle entertainment system for providing an entertainment to passengers on a commercial passenger vehicle is provided. The system comprises: passenger devices that are associated with respective passengers and including a first passenger device associated with a first passenger, the first passenger device including a monitor to display entertainment contents based on a selection made by the first passenger and configured to send a request to allow the first passenger to provide a live video obtained by capturing, in real time, an activity associated with the first passenger on the commercial passenger vehicle; and a server coupled to the passenger devices and configured to monitor communications between the server and the passenger devices and control processing of requests form the passenger devices based on monitoring of the communications, and wherein the server is further configured to: determine whether to accept the request form the first passenger device based on a predetermined rule; receive, in response to the determining to accept the request, the live video from the first passenger; and distribute the live video to one or more additional passengers on the commercial passenger vehicle.

In yet another exemplary aspect, the above-described methods are embodied in the form of processor-executable code and stored in a non-transitory computer-readable program medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Recent advances in digital video, computer and display technologies have made it possible to offer a large number of entertainment options to passengers traveling in a commercial vehicle. For example, international airlines often offer tens or hundreds of movies, television shows and audio programs produced across the globe to passengers. However, the present day technology for offering entertainment and information to passengers allows passengers to participate on board at a limited level only and such level of the participation allowed to passengers cannot be varied much among passengers. For example, the currently available entertainment contents are prerecorded and stored and in response to a selection from a passenger, the entertainment contents are distributed to the passenger. Thus, the currently available entertainment options do not able to allow a passenger to supply entertainment contents for live streaming not mention to allowing another passenger to share the live contents provided by the passenger.

The technical solutions described in the present document can be embodied in implementations to improve a passenger experience, among other features. Various examples of entertainment options are suggested to support and provide new and satisfying entertainment experiences that were not available in conventional passenger vehicles. Some examples of the suggested implementations include, for example, live video streaming, interactive chatting among passengers in commercial passenger vehicle, and/or rewarding a passenger to encourage more participation to in-flight entertainment options. Some additional examples of the suggested implementations include, for example, same simultaneous interactive entertainment, such as social games, e.g. trivia, puzzle solving, word searches, and/or other games, played at any seat using a seatback display or a PED with an overhead display or a Wifi portal among passengers in commercial passenger vehicle, and/or rewarding a passenger to encourage more participation to in-flight entertainment options. With various examples of the suggested entertainment options, it is possible to make a passenger more satisfying for entertainment services during travels, which can increase passenger experience during the time they stay in the vehicle. Also, by associating an entertainment option with a reward for items, e.g., products and flight tickets, it is also possible to create more business opportunities for commercial vehicles and other related companies to make additional profits.

Figure 1:
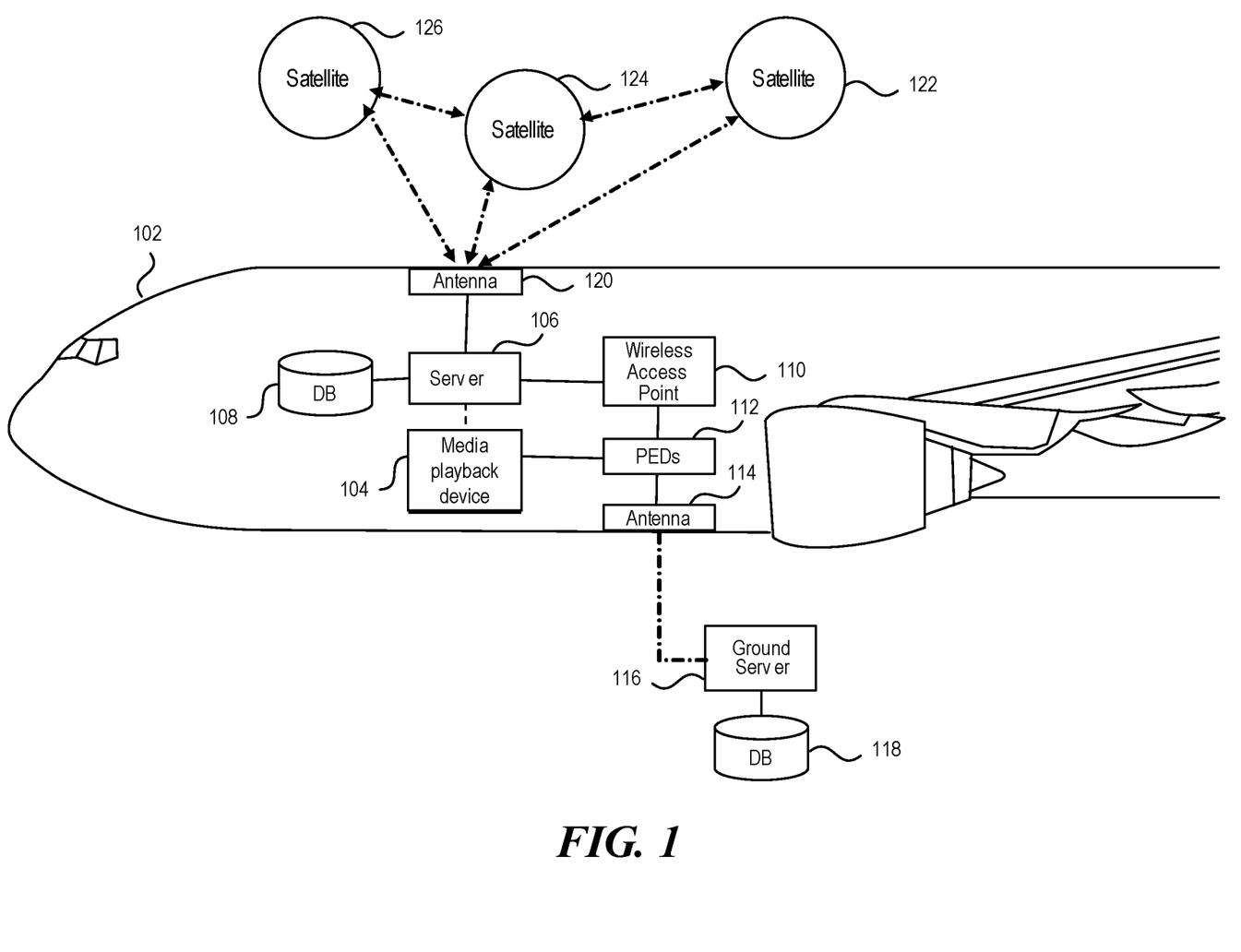
FIG. 1 shows an exemplary vehicle entertainment system installed in an airplane based on some implementations of the disclosed technology.

FIG. 1 shows an example of an entertainment system for passengers in a commercial passenger vehicle an airplane. As an example, FIG. 1 shows an in-flight entertainment system. The in-flight payment system includes a server 106, media playback devices 104, and a PED (personal electronic device) that are located in the airplane 102. The components shown as a single element in FIG. 1, e.g., the server 106, the database 108, etc. can be configured in multiple elements. For example, the in-flight entertainment system can include multiple servers and multiple databases to facilitate or support providing of more various entertainment options to the passengers. Most travelers carry PEDs having wireless communication capability, such as cellular phones, smart phones, tablet computers, laptop computers, and other portable electronic devices. Many of these PEDs have the capability to execute application software programs ("apps") to perform various functions, including controlling other devices and systems. For example, the PED 112 includes a live stream software application to support the in-flight entertainment services suggested in this patent document. The live stream software application is configured to program the PED 112 to perform the required functionalities and operations of the PED as will be further described.

The server 106 is communicably coupled with the media playback devices 104 and the PEDs 112. The communication between the server 106 and the onboard devices including the media playback devices 104 and the PEDs 112 is either realized by wired connections or wireless connections. For example, the communication among the server 106, the media playback devices 104, and the PEDs 112 are achieved, e.g. in the case of mounted seat entertainment terminals or by a provision of network plugs at the seat for plugging PEDs 112 to a wired onboard local area network. In some other implementations, the communications among the server 106, the media playback devices 104, and the PEDs 112 are achieved, e.g. via a GSM/3G/4G cellular network utilizing one or more onboard base station(s), Wi-Fi such as the wireless access point 110, and/or by Bluetooth. Thus, the server 106, the media playback devices 104, and the PEDs 112 form a local network aboard the airplane 102. In some implementations, the network is an Ethernet switch but can be based on other networking standards. The in-flight payment system can include an Ethernet switch unit which appropriately routes Ethernet frames carrying data and/or contents among the server 106, the monitors 104, and PEDs 112 on the network. The Ethernet switch unit may allow various Ethernet devices on the aircraft (e.g., the server 106, the media playback devices 104, the PEDs 112, etc.) to communicate with one another.

The server 106 is further communicatively coupled with a ground server 116 which is located outside the airplane 102, e.g. located in a computing center at an arbitrary location on the ground. The communication between the server 106 and the ground server 116 can utilize a wireless interface. For example, a satellite communication module and/or 3G/4G/5G transceiver module is mounted within the airplane 102 to which the server 106 is connected. The onboard server's connection to this communication module is realized via a wired line or, alternatively, via a wireless connection, e.g. by Wi-Fi. The communication module can also be attached to or integrated into the server 106. In the example of a satellite communication module, the communication module communicates via satellites 122, 124, and 126 (utilizing antennas 120 installed at the airplane 102) via one or more landline-based networks (WAN, Internet) to the ground server 116. In the example of a 3G/4G/5G transceiver module, the communication module communicates with a 3G/4G/5G mobile communication network on the ground which, in turn, connects the server 106 through potentially further landline-based networks (WAN, Internet) to the ground server 116.

The media playback devices 104 are configured to provide access to communication applications, internet browsing, and other computer applications, etc. In some implementations, the media playback devices 104 may be provided at each passenger seat such as mounted at each of the seatbacks of the passenger seats or above each of the passenger seats and allow each passenger to select from multiple video channels and/or audio channels, or even individually select and play videos from a library of videos. Each media playback device 104 may be equipped with a display and/or a camera. The in-flight entertainment system can send entertainment contents (e.g., audio, movies, television shows, or other videos) to displays of the media playback devices 104 and the media playback devices 104 can generate video contents using the cameras and send the entertainment contents to the in-flight entertainment system. In another example, the in-flight entertainment system can send entertainment contents, e.g., simultaneous interactive entertainment content, for example, social games, e.g. trivia, puzzle solving, word searches, and/or other games, played at any seat using a seatback display or a PED with an overhead display or a Wifi portal, to displays of the media playback devices 104 and the media playback devices 104 can generate video contents using the cameras and send the entertainment contents to the in-flight entertainment system. The media playback devices 104 can include one or more additional elements to assist live video streaming and live chatting.

The ground server 116 may provide the server 106 with basic and updated user data and authentication results as will be further explained in detail later. In some implementations, the ground server 116 works as the source of the user data or operate as an interface to other servers and networks hosting the user data and authentical results. For example, the server 106 can obtain from the ground server 116 information about passengers and stores the obtained passenger information in the database 108. For example, when the airplane 102 is waiting at an airport to board passengers or while the passengers are boarding the airplane 102, the server 106 can obtain from the ground server 116 information about passengers that are located in or are expected to board the airplane.

Figure 2:
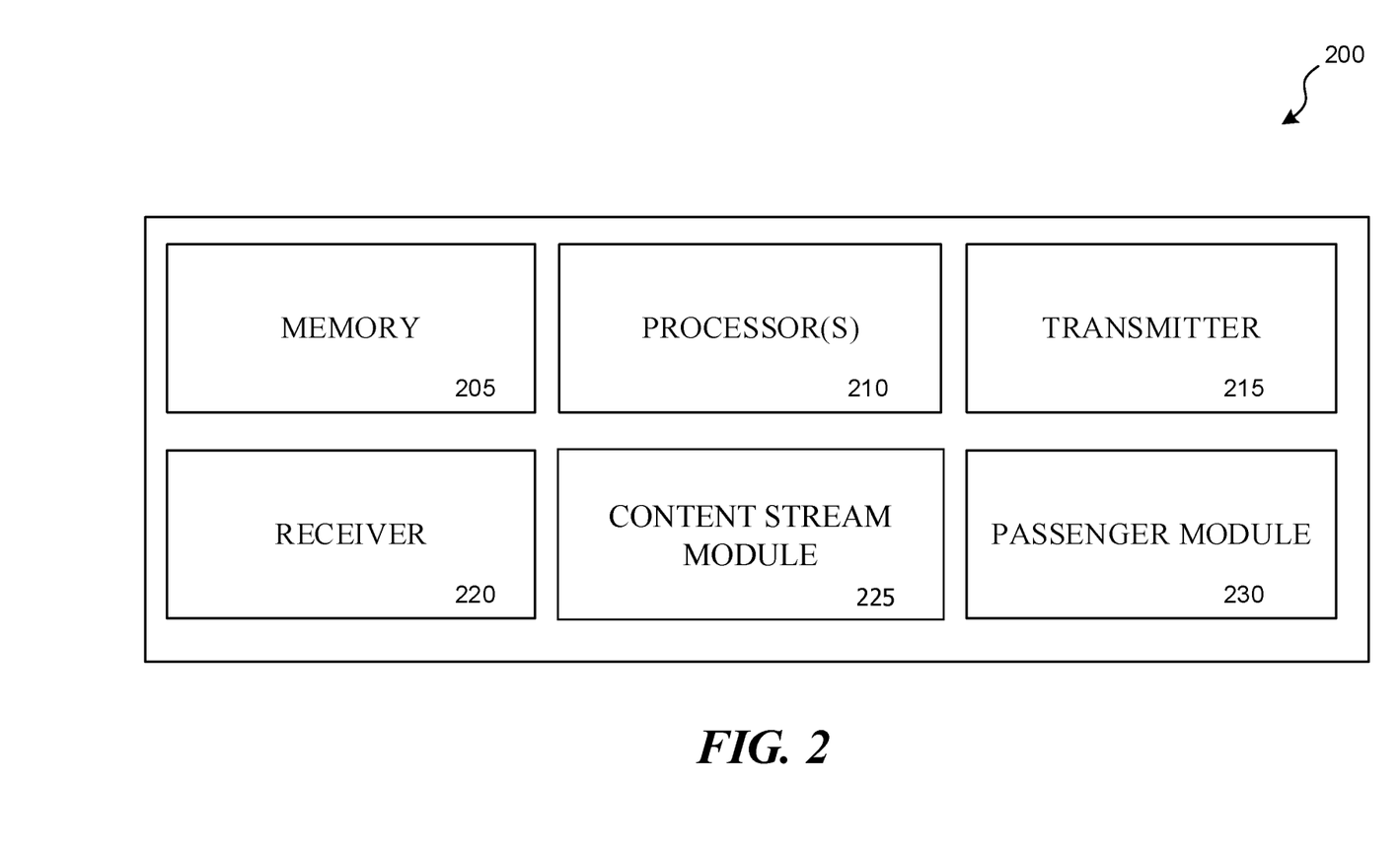
FIG. 2 shows an exemplary block diagram of a server included in an inflight entertainment system based on some implementations of the disclosed technology.
Figure 6:
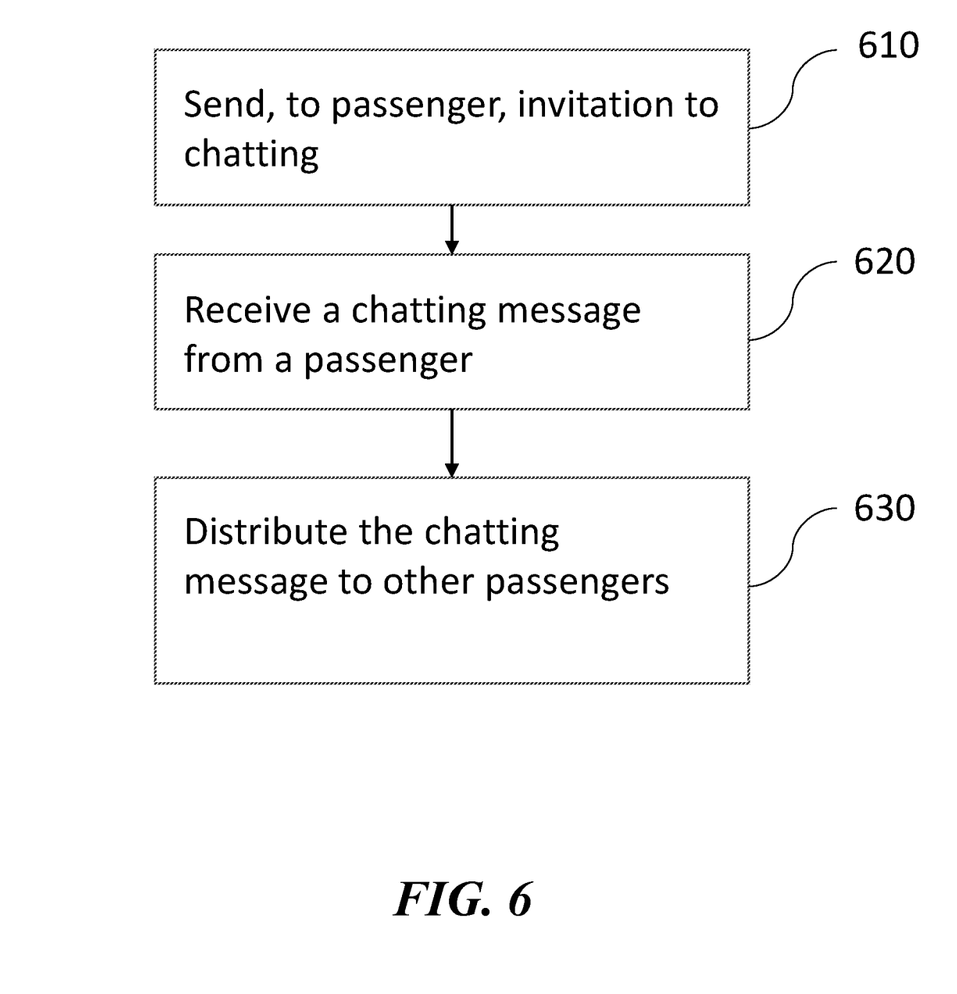
FIG. 6 shows an example flowchart of operations of in-vehicle entertainment system for supporting live chatting based on some implementations of the disclosed technology.
Figure 7:
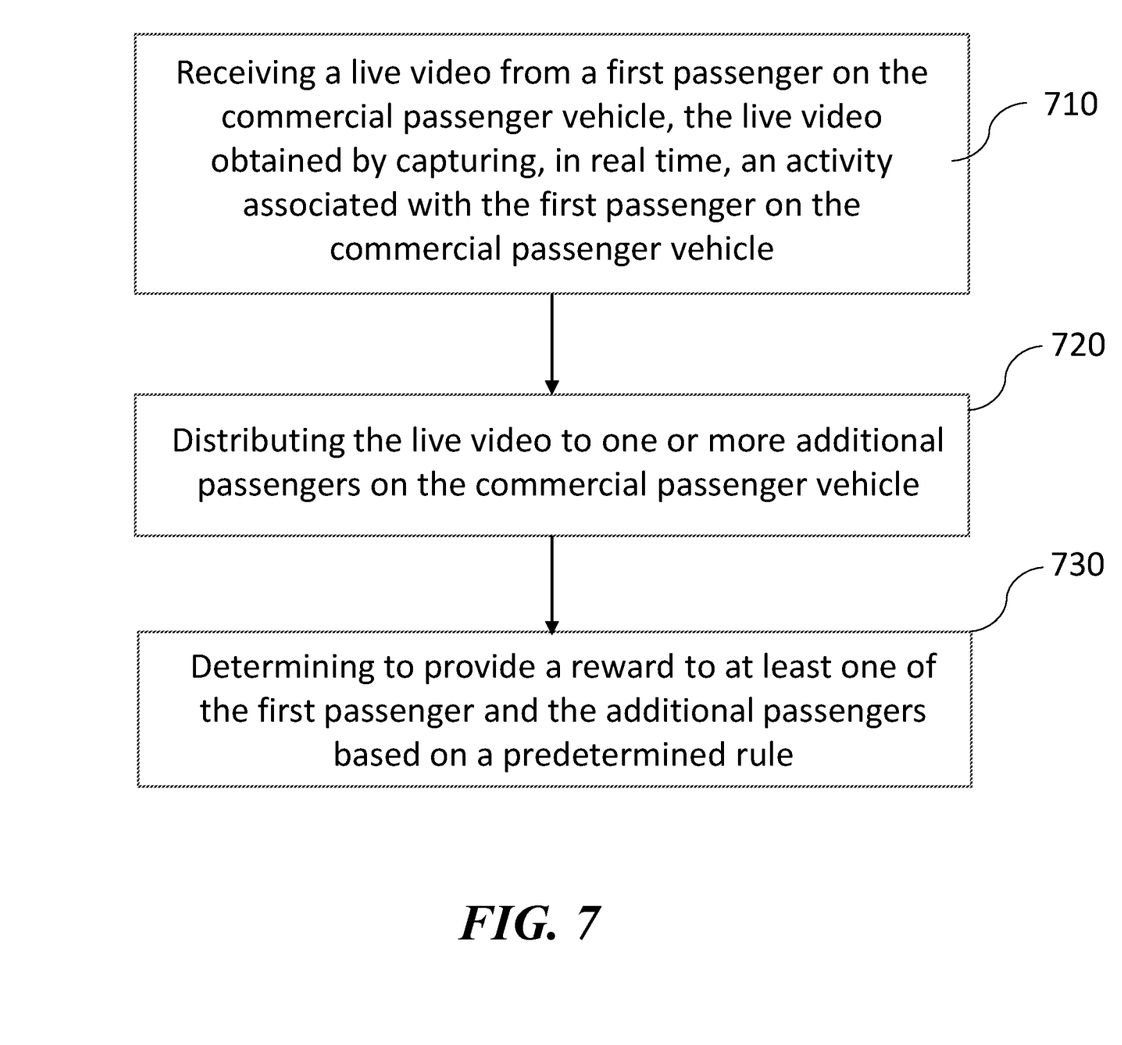
FIG. 7 shows an example flowchart of operations of in-vehicle entertainment system for rewarding a passenger based on some implementations of the disclosed technology.
Figure 8:
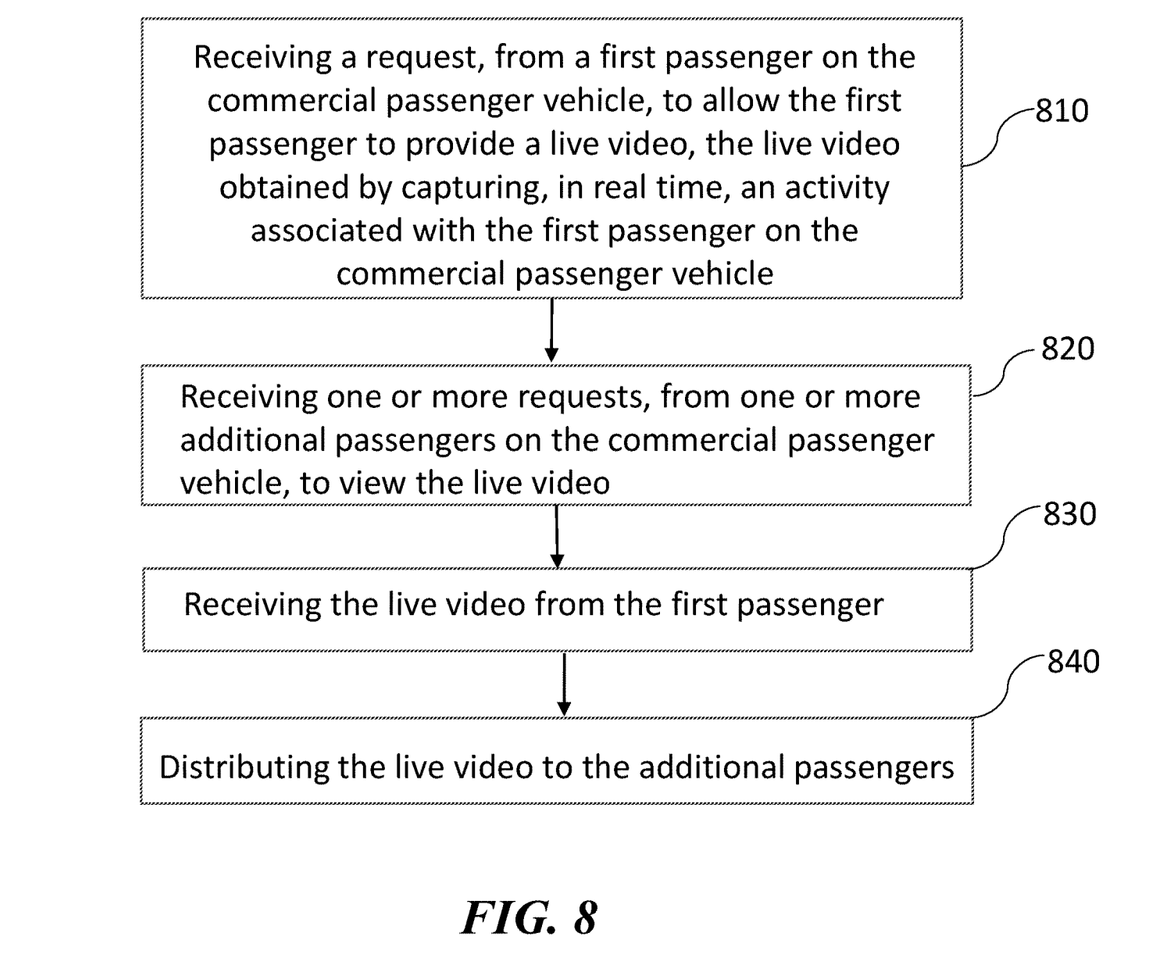
FIGS. 8 and 9 show example flowcharts of operations of in-vehicle entertainment system for allowing a passenger to provide a live video based on some implementations of the disclosed technology.

FIG. 2 shows an example block diagram of a server that is a part of an example of the in-flight entertainment system. The server 200 includes at least one processor 210, a memory 205, a transmitter 215, a receiver 220, a content stream module 225, or a passenger module 230. The memory 205 may store instructions to be executed by the processor 210. In other embodiments, additional, fewer, and/or different elements may be used to configure the server 200. The memory 205 is an electronic holding place or storage for information or instructions so that the information or instructions can be accessed by the processor 210. The memory 905 can include, but is not limited to, any type of random access memory (RAM), any type of read only memory (ROM), any type of flash memory, etc. Such as magnetic storage devices (e.g., hard disk, floppy disk, magnetic strips, etc.), optical disks (e.g., compact disk (CD), digital versatile discs (DVD), etc.), smart cards, flash memory devices, etc. The instructions upon execution by the processor 210 configure the server 200 to perform the operations (e.g., the operations as shown in FIGS. 6 to 8) which will be described in this patent document. The instructions executed by the processor 210 may be carried out by a special purpose computer, logic circuits, or hardware circuits. The processor 210 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 210 can perform the operations called for by that instruction.

The processor 910 operably couples with the memory 204, transmitter, 214, the receiver, 220, the content stream module 225, and the passenger module 230, etc. to receive, to send, and to process information and to control the operations of the server 200. The processor 210 may retrieve a set of instructions from a permanent memory device such as a ROM device and copy the instructions in an executable form to a temporary memory device that is generally some form of RAM. In some implementations, the server 200 can include a plurality of processors that use the same or a different processing technology. The transmitter 215 transmits or sends information or data to another device (e.g., another server 116, media playback devices 104, or PEDs 112). The receiver 220 receives information or data transmitted or sent by another device (e.g., another server 116, media playback devices 104, or PEDs 112). The content stream module 225 of the server 200 is configured to perform operations to assist the live streaming process which will be further discussed with regard to FIGS. 6 to 8. In some implementations, the content stream module 225 can be configured as a part of the processor 210. The content stream module 225 and the processor 210 are configured to process the live video provided from at least one of the passengers by including video processing and audio processing capabilities. The video processing may include encoding and decoding capabilities. Those functionalities can be implemented by software and/or hardware.

The passenger module 230 of the server 200 is configured to obtain information on passengers including names, prior travel histories, current travel information, any preselected movie list, preselected point of interests, interests, hobbies, etc. The passenger information can be obtained in multiple manners and stored in the content stream module 225. The passenger information can be obtained by the airlines and/or by a third-party prior to boarding of a corresponding passenger. In some implementations, if the passenger information was previously obtained and is stored in the relevant database, the server 200 can collect the passenger information from the relevant database. In some embodiments, for each flight, the ground server 116 may obtain names of the passengers that are expected to board the airplane 102 and information associated with the passengers.

As further explained, the disclosed technology provides a new entertainment option to a passenger in the passenger vehicle by allowing the passenger to be more engaged with providing the live entertainment contents. In addition to providing the live entertainment contents, some implementations assist chatting among passengers who watch a same live video content to share their excitement and reactions to the live video stream together. In some implementations, the in-vehicle entertainment system provides rewards to a passenger who has participated to providing the in-vehicle entertainment option, thereby encouraging more passenger to participate in providing in-vehicle entertainment contents. The example headings for the various sections below are used to facilitate the understanding of the disclosed subject matter and do not limit the scope of the claimed subject matter in any way. In addition, one or more features of one example section can be combined with one or more features of another example section.

A. Live Streaming on Board

Streaming content from Internet is clearly available today, but is limited by the available ground-to-air communications bandwidth, furthermore limited by the need for such communications means, and the expense of it all. Currently the only way to share an on-board user's video/game experience with the rest of the passengers is to have the player in a common area and display the video on a large screen. For example, as "eSports" becomes more and more popular, commercial passenger vehicles such as airlines may want to offer branded flights for people traveling to/from an eSports event with a high-profile gamer on board playing a game. Allowing passengers to all watch the event at the same time, see and hear the gamer's reactions, and chat about it while travelling in a passenger vehicle to a destination would provide a new entertaining experience that was not available in conventional passenger vehicles. Some people watch live streams for hours (e.g. speed runs through complex games can take over 24 hours) and so this new entertainment experience can provide a significant source of entertainment to those people. The implementations of the live video streamlining can be also applied for onboard "Battle Royale" games wherein eliminated players (passengers) could continue to watch the surviving players (passengers) battle it out for the win. The eliminated players could pick the player's feed to watch and all cheer for their chosen hero. Whether or not each surviving player offers video stream such as a face A/V feed would be up to them to opt into. Airlines could offer incentives for players to win (food, miles, etc.) to increase engagement and such incentives will be discussed in another section later in this patent document.

Figure 3:
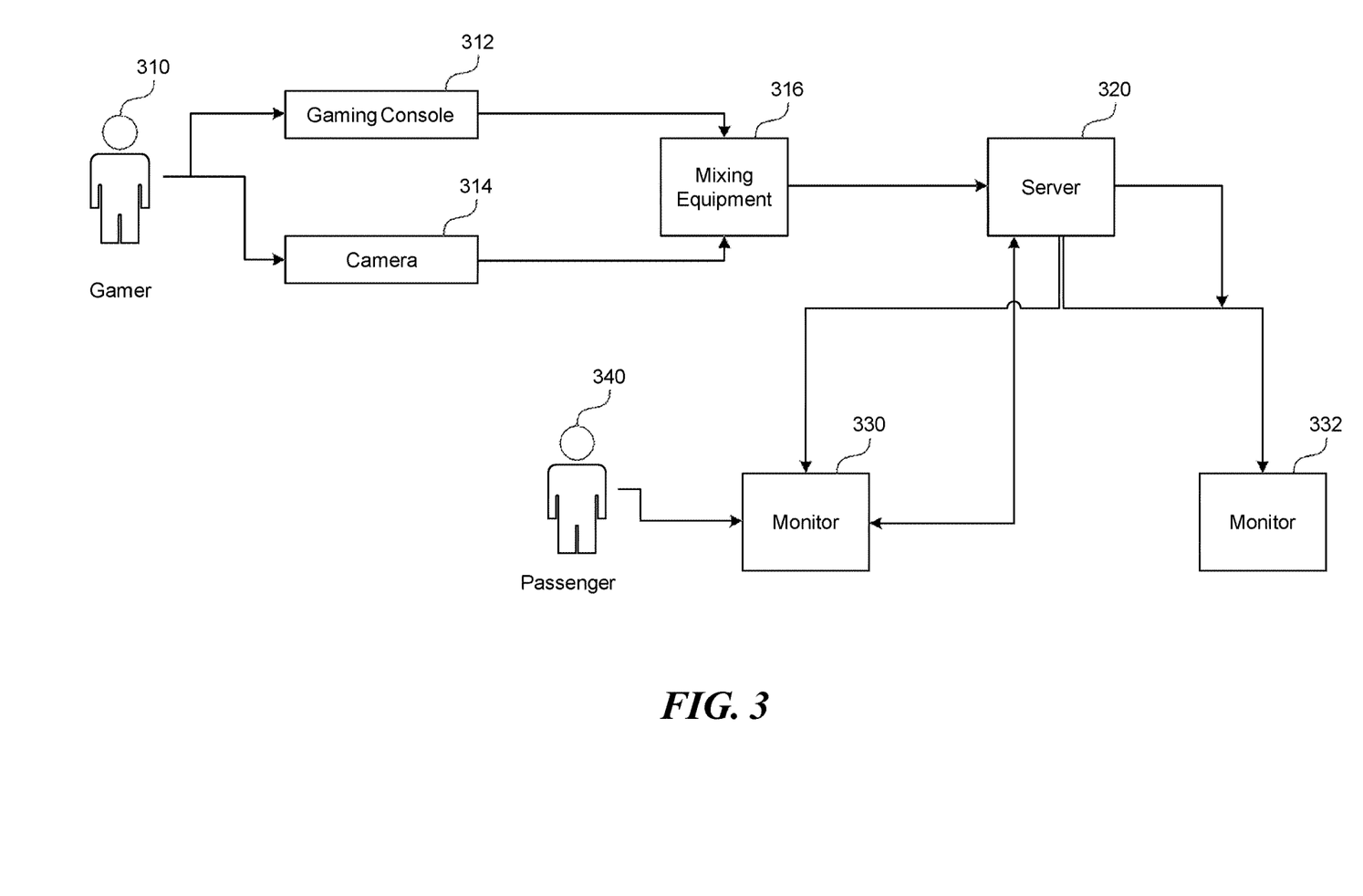
FIG. 3 shows an example diagram showing a passenger providing a live video stream using an additional device based on some implementations of the disclosed technology.
Figure 4:
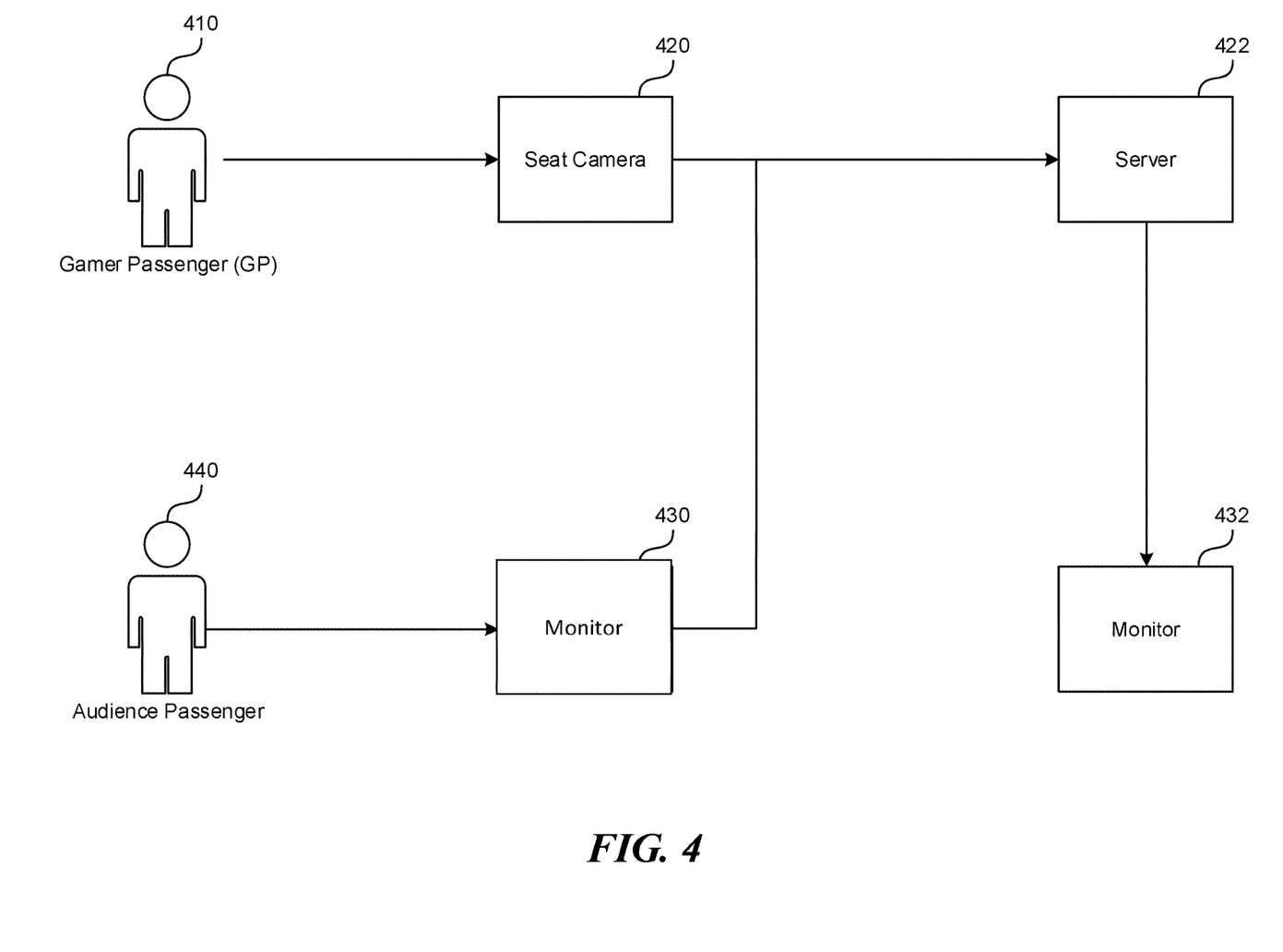
FIG. 4 shows an example diagram showing a passenger providing a live video stream using a media playback device based on some implementations of the disclosed technology.
Figure 5:
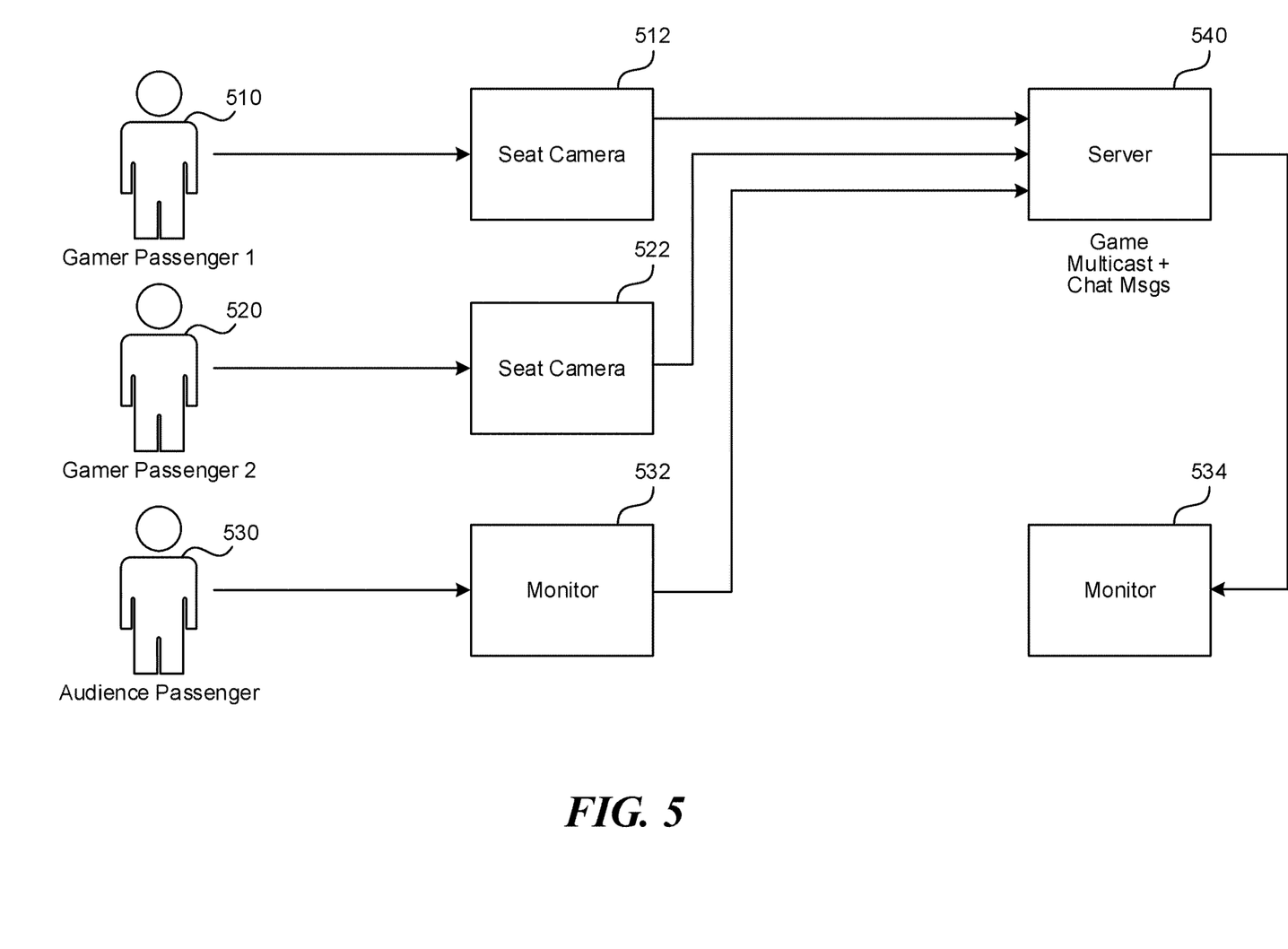
FIG. 5 shows an example diagram showing multiple passengers providing a live video stream using media playback devices based on some implementations of the disclosed technology.

Some implementations of the disclosed technology provide an entertainment system that allows a passenger to become a source of live video stream and another passenger to become a viewer of the live video stream. FIGS. 3 to 5 show different examples of an in-vehicle entertainment system based on some implementations of the disclosed technology. In FIGS. 3 to 5, the server 320, 420, 540 receives live video contents that are provided from a passenger 310, 410, 510, 520. In FIGS. 3 to 5, it is assumed that the live video contents provided from the passenger 310, 410, 510, 520 correspond to game contents that each passenger 310, 410, 510, 520 is playing. The implementations suggested can be applied to non-gaming applications too, such as live art instruction, crafting, building, or just "reality TV" style live vlogs by popular internet people. In addition, the lived video that are provided from a passenger 310, 410, 510, 520 may include audio as well. In this case, the server can recognize and process the audio together with the video.

Depending on sizes of a game that a passenger is playing and distributed to other passengers and/or characteristics of an event that the airplane offers, the entertainment system can allow the passenger to provide live video stream using various devices. For example, the passenger who desires to provide the live video stream can capture or record a video using a media playback device that has been already provided in the airplane and assigned to him or her. The media playback device might be equipped with a camera which can capture an area and a software program which can adjust the camera setting to capture or record the area. In some implementations, the passenger who desires to provide the live video stream can capture or record a video using his or her PED. The PED may need to have a live video capturing tool and a necessary software program to assist the live video capturing. In some implementations, the passenger who desires to provide the live video stream can be provided with additional devices to support creating video contents.

FIG. 3 shows the example that the gamer passenger 310 provides the live video stream using additional elements such as a gaming console 312, a camera 314, and a mixing equipment 316 that are provided on the airplane. In some implementations, these additional elements, e.g., the gaming console 312, the camera 314, and the mixing equipment 316, can be provided as the external devices or can be the part of the entertainment system. The gaming console 312 and the camera 314 are illustrated as examples of a video capturing device to provide live video stream and the live stream can be supplied to the mixing equipment 316 for making the captured video in a format compatible with the in-vehicle entertainment system. For example, the mixing equipment 316 processes the live video stream and feed the video that is compatible in-vehicle entertainment system, e.g., video on demand (VOD) or AVOD (audio-video on demand). The additional equipment could also capture the entire A/V feed to disk for AVOD playback at a later time, either on the Internet or on other aircraft of the same airline.

In FIG. 3, the server 320 is configured to receive the live video contents from the additional element, e.g., mixing equipment 316, and distribute the live video contents to monitors 330 and 332 of media playback devices that are assigned to different passengers, respectively. For example, the server 320 is configured to transmit the live video contents provided by the passenger 310 to another passenger 340. Before transmitting the live video contents, the server 320 may receive a request from the passenger 340 to view the live video contents provided from the passenger 310. For this, the server 320 can be configured to provide information to passengers onboard regarding available live video stream so that a passenger can make a request for a certain live video stream he or she is interested. Such information can be provided to passengers on board when the server 320 receives the request from the passenger 310 to allow the passenger to provide the live video stream or when the server 320 sends the indication to the passenger 310 to allow such request. In this way, another passenger 340 onboard can express the desire to watch a certain live vide stream provided by the passenger 310 and the server 320 can provide the live video stream to passengers interested. In some implementations, the entertainment system is further configured to allow the passenger 340, who is watching the live video contents provided by another passenger, to engage with the in-vehicle entertainment system by, for example, sending a live chat message through the monitor 330 of the media playback device associated with the passenger. The chat message entered through the monitor 330 of the media playback device is sent to the server 320 and the server sends the chat message together with the live video stream to monitors 330 and 332. The live chatting supported by the in-vehicle entertainment system will be further discussed with the different heading later in this patent document.

FIG. 4 shows another example of a scenario in which live video stream is provided using a seat camera equipped in a media playback device associated with a passenger. Using the seat camera, the passenger 410 can opt in to provide the live stream of his or her play so that other passengers watch it. Since the gamer passenger 410 provides the live video stream using the seat camera 412 that has been integrated in the media playback device provided at each passenger seat, as compared to the example shown in FIG. 3, there is no need for external or additional devices such as the gaming console 312, the camera 314, and the mixing equipment 316. In this example, the seat camera of the media playback device 420 is configured to be capable of capturing a live video feed of that game play and multicasting it back into the in-vehicle entertainment so that other users to watch. The media playback device can also provide the microphone capability. In some implementations, the passenger 410 can play his or her game on the display equipped in the PED using Wi-Fi to access the onboard game portal, or on the screen equipped in the media playback device associated with the passenger using either the seatback touchscreen or in-vehicle entertainment controller for interactions. In some implementations, the video feed may be provided with off-screen keyboards or controller without touch screens, which is provided as wired or wireless peripherals to a passenger seat, either as handout or perhaps built into premium class seats. In FIG. 4, The audience passenger 440 can also engage with the entertainment system by sending the chat message through the monitor 430 of the media playback device 430 associated with the audience passenger 440 and the server receives the chat message from the audience passenger 440 and provides the live video stream and the chat passage to the monitor 432 associated with another passenger.

FIG. 5 shows another example of a scenario where two passengers become sources of live video stream. To support the multiple passengers becoming sources of the live video stream, special wired connections could be arranged to provide the multicast feeds. In FIG. 5, the 'Game Passenger 1' 510 and 'Game Passenger 2' 520 can both provide video streams and send the video streams to the server using the seat cameras 512 and 522 of the media playback devices provided to the 'Game Passenger 1' 510 and 'Game Passenger 2' 520, respectively. In some implementations, the server 540 is configured to identify whether the request form the 'Game Passenger 2' 520 is about the same game that the 'Game Passenger 1' is already playing. For example, 'Game Passenger 2' 520 who already is being provided with the live video created by the 'Game Passenger 1' 510 may want to join to play the game. Let's assume that the server 54-receives such request from 'Game Passenger 2' 520 to join playing of the same game while he or she is watching the game play of the 'Game Passenger 1' 510. In this case, the server 540 can support processing the request by allowing the 'Game Passenger 2' 520 to modify the live video to add the play of 'Game Passenger 2' 520. Such modification can be achieved by a software to allow remote playing of the multiplayer games or achieved by adding the video corresponding to the play of 'Game Passenger 2' 520 by capturing the play of 'Game Passenger 2' 520.

In some other implementations, if 'Game Passenger 2' 520 requests to provide another separate video stream that is irrelevant to the game that the 'Game Passenger 1' 510 is playing, the server 540 processes the request and allow the 'Game Passenger 2' 520 to provide another live video stream. In this case, the server 540 can receive multiple video streams from both 'Game Passenger 1' and 'Game Passenger 2' and processes the multiple live video streams for respective distributions. For example, the live video stream provided by the 'Game Passenger 1' 510 and the live video stream provided by the 'Game Passenger 2' 520 will be distributed to different groups of passengers, respectively. In some implementations, the server can provide list of available live video streams to the passengers so that the passenger can select one he or she is interested among those available. The audience passenger 530 can send the chat message to the server. The server 540 receives the live video streams and the chat message and provide the live video stream and the chat message to the monitor 534 associated with another passenger.

Although three different examples have been shown with reference to FIGS. 3 to 5, examples are not limited thereto. For examples, more passengers can join to provide live video streams through seat cameras or additional video capturing equipment and/or join to communicate using chat messages.

B. Live Chatting while Viewing Live Video Stream on Board

As shown in FIGS. 3 to 5, some implementations of the disclosed technology support live chatting during a watch of live video stream. Conventional in-vehicle entertainment system could not support live chatting while viewing entertainment contents due to limitations on technical capabilities of the monitor software (to only run one app at a time), screen size, and lack of a separate keyboard (e.g., a touchscreen needs to be displayed on screen for most configurations). Thus, chatting about the same content was not generally available unless passengers sit close enough so that they can hear one another. With the live contents being provided in the airplane, among passengers who watch the same live content, there will be more demands for a way to share their ideas and reactions to the live contents being distributed.

The server of the in-vehicle entertainment system can be configured to provide a chat platform for passengers watching the live video stream. FIG. 6 shows an example of operations performed by an in-vehicle entertainment system for assisting chatting. At operation 612, the server sends, to each of passengers who watches the live video stream, an invitation like "Click here to chat with other people watching Live Video X". The server can identify passengers who are watching a same live video stream based on seat numbers and send the invitation for chatting to passengers who watch the same live video content. When there are multiple live video streams available, the server can send the invitation to each group of passengers, each group including passengers watching the same live video content. At operation 614, the server receives a chat message from a passenger. For this, the entertainment system has already established paths among the passengers, through which the chat messages can be communicated. At step 616, in addition to distributing the live video stream, the server distributes the chat message to other passengers who are watching the same live video stream. In some implementations, the server can consider that passengers watching a certain live video stream agree the viewing of the chat message as well and so can send the chat message to the certain passengers watching the live video stream. In some other implementations, the server can be implemented to send an additional message to check whether passengers watching the certain live video stream wants to view the chat message and based on the results, the server can distribute the chat message to passengers only who agree to view the chat message while watching the live video stream. Referring back to FIGS. 3 to 5, the server 320, 420, 540 receives a chat message from the audience passenger 340, 440, 530 and distributes the chat message along with the live video stream.

The video stream and the chat message can be distributed to other passengers through monitors 332, 430, and 534. In some implementations, the server of the in-vehicle entertainment system can provide a message before providing the video stream with the chat message, for example, "would you like to watch the live video stream with enabled chat?" The server of the in-vehicle entertainment system can be configured to provide the live video stream along with the chat message to passengers only who have expressed their agreement to be provided with the chat messages and provide the live video stream without the chat message to remaining passengers who have not expressed their interest with the chat messages. As further discussed below, the passengers can use the chat service through the media playback systems assigned thereto or their own PEDs or a separate display which can be available at some premium seats. Depending on circumstances, the passengers can select to share the same screen for the chat and the live video or use different screens for the chat and the live video, respectively. When the passenger selects to use different screens for the chat and the live video, the server of the in-vehicle entertainment system can be configured to send the live video stream and the chat message to the respective devices.

As shown in FIGS. 3-5, in some implementations, the monitors and cameras provided as seatback or overhead multimedia devices can be used to support chat among passengers. With advances in seatback software technology (e.g., Android 7+), and in screen size, it is possible to allow passengers to chat on the same screen providing the live video stream. One reason this has not occurred up to now has been lack of a usable keyboard or microphone while to draw a keyboard on the screen at the same time as a chat window and a video window would take up too much screen space, making the video quite small. With advances in touch screen handsets that can now display keyboards with larger keys than the physical ones that were squeezed onto the back of previous generation handsets, the keyboard issue can go away.

In some implementations, passenger PEDs can be used to support the live chat among passengers in the airplane. Since most PEDs have a microphone built-in or as a plugin device, it is even possible to enjoy voice chat using the PEDs. The implementation to use the PEDs may rely on Wi-Fi connectivity for the PEDs. Either the chat application can be built into an airline entertainment app (providing other entertainment options than the chat) or it is possible to provide a standalone chat app like Discord, that allows group chat, if a corresponding chat server can be made accessible to the passenger via Wi-Fi. Depending on the arrangement of the hardware assisting the chat, the chat option can be provided with or without Internet connectivity. If the hardware to assist the chat is placed on the vehicle, it allows chat to operate with no internet connectivity. With the airline app integration, the hardware is also required on the vehicle that relays the chat messages to each passenger. In some implementations, if Internet access is available from the vehicle, for the passengers to chat using whatever internet-based chat applications they are used to using, utilizing existing simultaneous viewing functionality within the in-vehicle entertainment system is supported.

C. Rewarding on Board

To increase more participations and more engagements from passengers, the in-vehicle entertainment system can offer various rewarding options. FIG. 7 shows an example of operations of in-vehicle entertainment system for rewarding a passenger. At operation 710, the server of the in-vehicle entertainment system receiving a live video from a first passenger on the commercial passenger vehicle, the live video obtained by capturing, in real time, an activity associated with the first passenger on the commercial passenger vehicle. At operation 720, the server distributes the live video to one or more additional passengers on the commercial passenger vehicle. At operation 730, the server determines to provide a reward to at least one of the first passenger and the additional passengers based on a predetermined rule. The predetermined rule may be related to performance of the activity related to the live video, a number of participants to join the activity related to the live video, and/or a number of viewers to view the live video. In some implementations, the operation 730 of determining to provide the reward may be initiated upon detecting an end of the live video provided by the first passenger. In some implementations, the server can provide a list of available rewards to the identified passenger so that the identified passenger can select one he or she wants from the list. A software application or others can be used to return the rewards to the identified winner.

Providing rewards may either be electronic means or physical. Value of the rewards could be funded by the transport provider (in terms of credits for future flights), the passengers themselves (buy-in to play the game), or sponsors of the game (who in return get views of their brand or ads). In some implementations, the in-vehicle entertainment system can be configured to provide a public announcement on the winner to further encourage the passenger participations and engagements. For the public announcement, the in-vehicle entertainment system prepares the audio and/or video indicating the winner using the seat number and distribute the audio and/or video to passengers through the media playback devices or PEDs. For example, this announcement can be made by the cabin crew as the live audio or can be made by using recorded voice phrases with synthesized voice for the changing parameters, "Congratulations to <32A> for winning <$amount> in latest bingo game." The similar notification can be provided as text alerts on the seatback displays.

In some implementations, cabin crew could immediately offer for free items offered for sale on board, e.g., food, drink, or duty-free items, of value as deemed appropriate for the game. Or they could deliver a coupon free for the same or for air miles credit or a future seat upgrade if the winner prefers the credits. Cash can be also used could also be used, but less preferred. In some implementations, the electronic rewards can be provided to the winner. For example, if payment is collected (ex. a buy-in for bingo) then an immediate credit can be issued back to the provided payment method. In fact, buy-in would increase the potential rewards since the more people who play, the higher the payoff. Payment using frequent flyer/traveler miles can also be offered using a card reader or known account. If passenger manifest is available to the seatback IFE system or access to personal information has been provided to a PED airline app (e.g., Companion App), credit can be immediately be provided to the passenger's frequent flyer/traveler account, or their associated payment/social IDs (ex. stored credit card, Amazon Prime credit, Venmo, PayPal, CashApp, WeChat payment, Apple Cash, etc.). Some of those may require Internet connectivity, so if that is not provided, other means would have to be used or the returning of the rewards can be achieved after the Internet connectivity becomes available.

FIG. 8 shows an example of operations of an in-vehicle entertainment system based on some implementations of the disclosed technology. At operation 810, the server of the in-vehicle entertainment system receiving a request, from a first passenger on the commercial passenger vehicle, to allow the first passenger to provide a live video, the live video obtained by capturing, in real time, an activity associated with the first passenger on the commercial passenger vehicle. At operation 820, the server receives one or more requests, from one or more additional passengers on the commercial passenger vehicle, to view the live video. At operation 830, the server receives the live video from the first passenger. As discussed above, depending on the size of the game and/or the event, the passenger can provide the live video using the media playback device, PED, or additional devices. Before the operation 830 of receiving the live video from the first passenger, the server may provide an acceptance message to allow the first passenger to provide the live video. Before or after the accepting the request from the first passenger or before receiving the live video from the first passenger, the server may receive from the first passenger information on which device is to be used by the first passenger to provide the live video and make necessary adjustments to receive a corresponding live video stream. As discussed with FIGS. 3-5, the server can receive the live video from the external devices such as the mixing equipment 316 or the seat cameras 420, 512, 522. At operation 824, the server distributes the live video stream to the additional passengers. In some implementations, the server can provide some information about live video available to passengers so that passengers can be informed on the contents and make a decision to view the live video.

Figure 9:
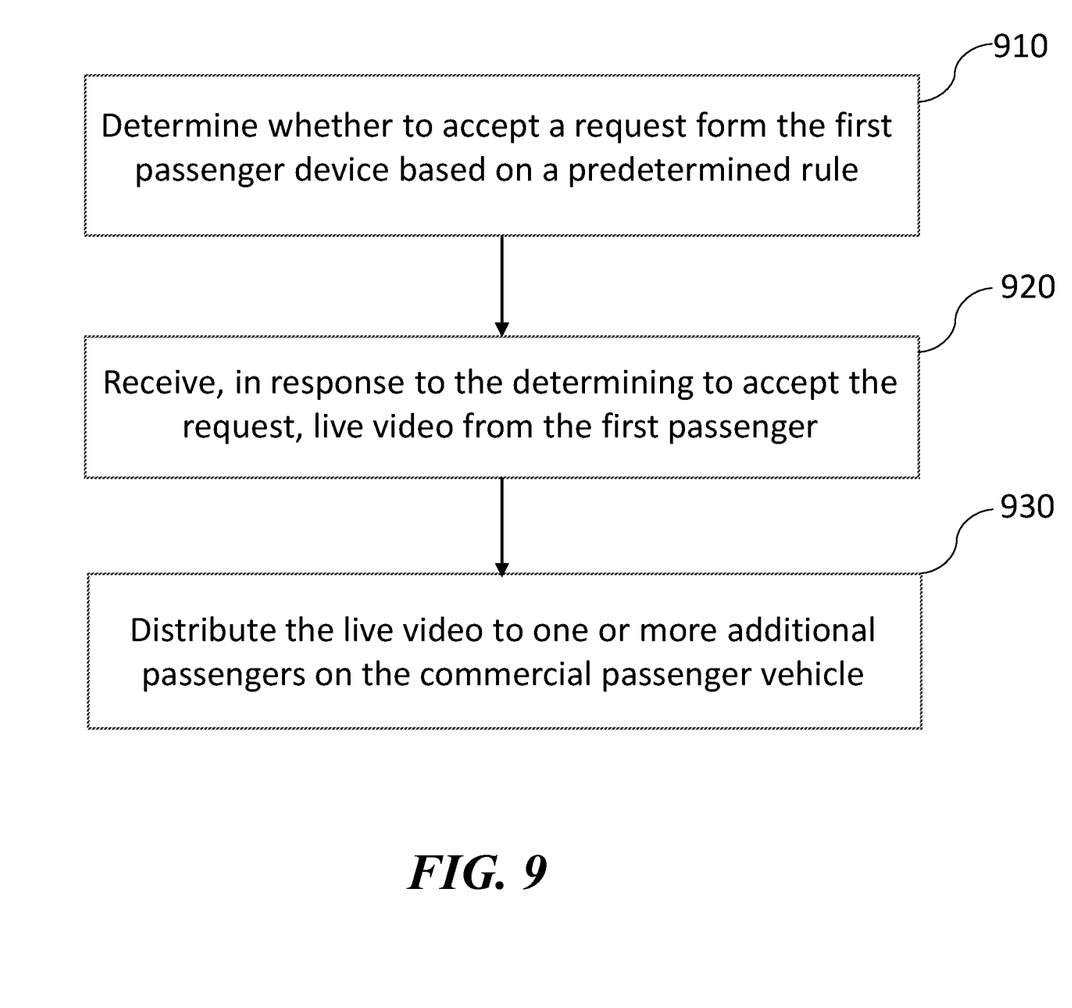

FIG. 9 shows an example of operations of an in-vehicle entertainment system based on some implementations of the disclosed technology. At operation 910, the server determines whether to accept a request form the first passenger device based on a predetermined rule. The request may be to allow the first passenger to provide a live video obtained by capturing, in real time, an activity associated with the first passenger on the commercial passenger vehicle. The predetermined rule relates to at least one of a decency of the live video, a policy of the commercial passenger vehicle, an amount of current traffic from the communications, or an amount of an increase in traffic from the live video. At operation 920, the server receives, in response to the determining to accept the request, the live video from the first passenger. At operation 930, the server distributes the live video to one or more additional passengers on the commercial passenger vehicle.

In some implementations, the technique discussed with reference to at least one of FIG. 6 or FIG. 7 can be combined with the operations as shown in FIG. 8 and/or FIG. 9. For example, the server receives a chat message from a second passenger who is one of the additional passengers who are watching the live video provided by the first passenger and distribute the chat message to some of the additional passengers. In addition, in some implementations, the server can determine to provide a reward to at least one of the first passengers and the additional passengers based on a predetermined rule.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A method of providing an entertainment to passengers on a commercial passenger vehicle, the method comprising:
   receiving a request, from a first passenger on the commercial passenger vehicle, to allow the first passenger to provide a live video, the live video obtained by capturing, in real time, an activity associated with the first passenger on the commercial passenger vehicle;
   receiving one or more requests, from one or more additional passengers on the commercial passenger vehicle, to view the live video;
   receiving the live video from the first passenger; and
   distributing the live video to the additional passengers, wherein the method further comprises:
   receiving, from a second passenger who is one of the additional passengers on the commercial passenger vehicle, a request for a participation to modify the live video with a video obtained by capturing an activity associated with the second passenger on the commercial passenger vehicle; and
   determining to provide a reward to at least one of the first passenger and the additional passengers based on a performance of participations in the live video, a number of participants to participate in the live video, and/or a number of viewers to view the live video.

2. The method of claim 1,
   wherein the modified live video is distributed to the additional passengers.

3. The method of claim 1, further comprising:
   receiving a request, from a third passenger, to allow the third passenger to provide another live video that is separate from the live video, the another live video obtained by capturing, in real time, another activity associated with the third passenger; and
   distributing the another live video to a fourth passenger.

4. The method of claim 1, further comprising:
   sending, to the additional passengers, an invitation message to allow the additional passengers to initiate a chat.

5. The method of claim 4, further comprising:
receiving a chat message from a third passenger who is one of the additional passengers; and
distributing the chat message to some of the additional passengers.

6. A method of providing an entertainment to passengers on a commercial passenger vehicle, the method comprising:
receiving a live video from a first passenger on the commercial passenger vehicle, the live video obtained by capturing, in real time, an activity associated with the first passenger on the commercial passenger vehicle;
distributing the live video to one or more additional passengers on the commercial passenger vehicle;
receiving, from a second passenger who is one of the additional passengers on the commercial passenger vehicle, a request for a participation to modify the live video with a video obtained by capturing an activity associated with the second passenger on the commercial passenger vehicle; and
determining to provide a reward to at least one of the first passenger and the additional passengers based on a predetermined rule that is related to a performance of participations in the live video, a number of participants to participate in the live video, and/or a number of viewers to view the live video.

7. The method of claim 6, wherein the determining determines to provide the reward the first passenger for providing the live video.

8. The method of claim 6, further comprising: providing, to the at least one of the first passenger and the additional passengers, a list of available rewards.

9. The method of claim 6, further comprising:
identifying a seat number assigned to the at least one of the first passenger and the additional passengers; and
transmitting a public announcement that includes an identified seat number to passengers on the commercial passenger vehicle.

10. An in-vehicle entertainment system for providing an entertainment to passengers on a commercial passenger vehicle, the system comprising:
passenger devices that are associated with respective passengers and including a first passenger device associated with a first passenger, the first passenger device including a monitor to display entertainment contents based on a selection made by the first passenger and configured to send a request to allow the first passenger to provide a live video obtained by capturing, in real time, an activity associated with the first passenger on the commercial passenger vehicle; and
a server coupled to the passenger devices and configured to monitor communications between the server and the passenger devices and control processing of requests from the passenger devices based on monitoring of the communications, and
wherein the server is further configured to:
determine whether to accept the request from the first passenger device based on a predetermined rule;
receive, in response to the determining to accept the request, the live video from the first passenger, the live video obtained by capturing, in real time, an activity associated with the first passenger on the commercial passenger vehicle; and
distribute the live video to one or more additional passengers on the commercial passenger vehicle,
wherein the server is further configured to:
receive, from a second passenger who is one of the one or more additional passengers on the commercial passenger vehicle, a request for a participation to modify the live video with a video obtained by capturing an activity associated with the second passenger on the commercial passenger vehicle; and
determine to provide a reward to at least one of the first passenger and the one or more additional passengers based on a predetermined rule that is related to a performance of participations in the live video, a number of participants to participate in the live video, and/or a number of viewers to view the live video.

11. The system of claim 10, wherein the predetermined rule further relates to at least one of a decency of the live video, a policy of the commercial passenger vehicle, an amount of current traffic from the communications, or an amount of an increase in traffic from the live video.

12. The system of claim 11, wherein the server is configured to receive the live video from a mixing element that process the live video in a format supported by the server.

13. The system of claim 10, wherein the first passenger device includes a video capturing element to capture the activity and the server is configured to receive the live video from the first passenger device.

14. The system of claim 10, wherein the passenger devices include at least one of a media playback device provided on back or overheads of a seat assigned to a corresponding passenger or a personal electronic device that is portable and carried by a corresponding passenger.

15. The system of claim 10,
wherein the modified live video is distributed to the additional passengers.

16. The system of claim 10, wherein the server is further configured to:
receive a request, from a third passenger, to allow the third passenger to provide another live video that is separate from the live video, the another live video obtained by capturing, in real time, another scene associated with the third passenger; and
distribute the another live video to a fourth passenger.

17. The system of claim 10, wherein the server is further configured to receive, from a third passenger who is one of the additional passengers, a chat message, and distribute the chat message along with the live video.

18. The system of claim 10, wherein the server is further configured to identify a seat number assigned to the at least one of the first passenger and the additional passengers and transmit a public announcement that includes an identified seat number to passengers on the commercial passenger vehicle of those who won the reward.

* * * * *